United States Patent [19]

Malik

[11] Patent Number: 4,746,859
[45] Date of Patent: May 24, 1988

[54] POWER AND TEMPERATURE INDEPENDENT MAGNETIC POSITION SENSOR FOR A ROTOR

[75] Inventor: Khalid Malik, Rockford, Ill.

[73] Assignee: Sundstrand Corporation, Rockford, Ill.

[21] Appl. No.: 944,958

[22] Filed: Dec. 22, 1986

[51] Int. Cl.[4] ............................................. G01B 7/30
[52] U.S. Cl. ..................................... 324/208; 324/225
[58] Field of Search ....................... 324/160, 163–166, 324/173, 174, 207, 208, 225; 123/414, 617; 318/653; 340/672, 686, 870.32, 870.33

[56] References Cited

U.S. PATENT DOCUMENTS

| | | | |
|---|---|---|---|
| 3,479,582 | 11/1969 | Meyer | 324/207 |
| 3,728,565 | 4/1973 | O'Callaghan | 310/168 |
| 3,819,268 | 6/1974 | Johnson | 356/28 |
| 4,166,977 | 9/1979 | Glauert et al. | 324/173 |
| 4,204,158 | 5/1980 | Ricouard et al. | 324/208 |
| 4,241,300 | 12/1980 | Hayes et al. | 318/590 |
| 4,258,324 | 3/1981 | Henrich | 324/392 |
| 4,280,165 | 7/1981 | Pospelov et al. | 361/236 |
| 4,288,746 | 9/1981 | Singbartl | 324/174 |
| 4,293,837 | 10/1981 | Jaffe et al. | 324/208 X |
| 4,319,188 | 3/1982 | Ito et al. | 324/173 |
| 4,326,166 | 4/1982 | Pigeon et al. | 324/225 |
| 4,359,685 | 11/1982 | Eguchi et al. | 324/208 |
| 4,369,405 | 1/1983 | Sato et al. | 324/174 |
| 4,370,614 | 1/1983 | Kawada et al. | 324/173 |
| 4,480,248 | 10/1984 | Sudo et al. | 338/32 R |
| 4,481,469 | 11/1984 | Hauler et al. | 324/174 |
| 4,490,674 | 12/1984 | Ito | 324/208 |
| 4,506,217 | 3/1985 | Rothley et al. | 324/208 |
| 4,506,220 | 3/1985 | Sawada et al. | 324/252 |
| 4,506,339 | 3/1985 | Kuhnlein | 364/565 |
| 4,518,918 | 5/1985 | Avery | 324/208 |
| 4,570,118 | 2/1986 | Tomczak et al. | 324/208 |

FOREIGN PATENT DOCUMENTS

| | | | |
|---|---|---|---|
| 0036051 | 3/1977 | Japan | 324/208 |
| 42412 | 9/1983 | Japan | 324/208 |
| 0061616 | 4/1985 | Japan | 324/208 |
| 8201178 | 10/1983 | Netherlands | 324/208 |
| 1226037 | 4/1986 | U.S.S.R. | 324/207 |

Primary Examiner—Gerard R. Strecker
Attorney, Agent, or Firm—Wood, Dalton, Phillips, Mason & Rowe

[57] ABSTRACT

In order to optimize the electrical performance in motors in terms of improved efficiency, power factor, and reduced current, a power and temperature magnetic position sensor for a rotor utilizes first and second magnetic sensing devices for accurately determining the angular position of the rotor. The first and second magnetic sensing devices include at least one target operatively associated with the rotor so as to rotate therewith, a first sensor disposed at a variable distance from the target dependent upon the angular position of the rotor to define a first air gap therebetween, and a second sensor disposed at a variable distance from the target dependent upon the angular position of the rotor to define a second air gap therebetween. The first and second sensors cooperate with the target to detect magnetic field intensity in the first and second air gaps, respectively, and produce output signals indicative of the magnetic field intensity which, at any point in time, is dependent upon the length of the first and second air gaps as determined by the position of the first and second sensors relative to the target at that point in time. The first and second sensors are also operatively associated with a compensating circuit which includes an electronic adder for adding the output signals produced by the first and second sensors, an electronic subtractor for subtracting the output signals produced by the first and second sensors, and an electronic divider for dividing the added output signals by the subtracted output signals. Since the output signals change in magnitude in a manner indicative of the magnetic field intensity by reason of changes in the length of the first and second air gaps, the electronic divider produces a numerical value representative of the accurate angular position of the rotor which is independent of power supply and temperature variations.

43 Claims, 2 Drawing Sheets

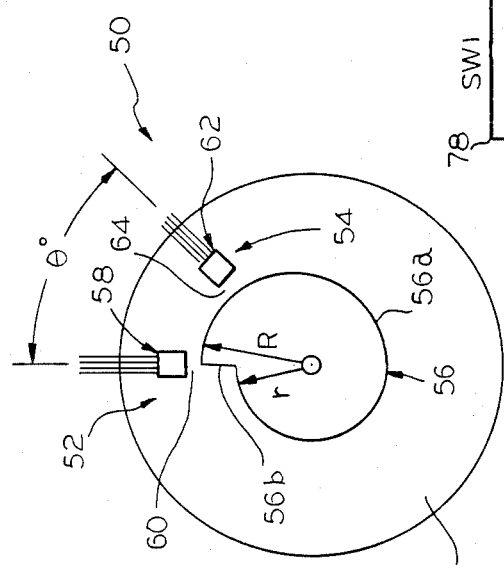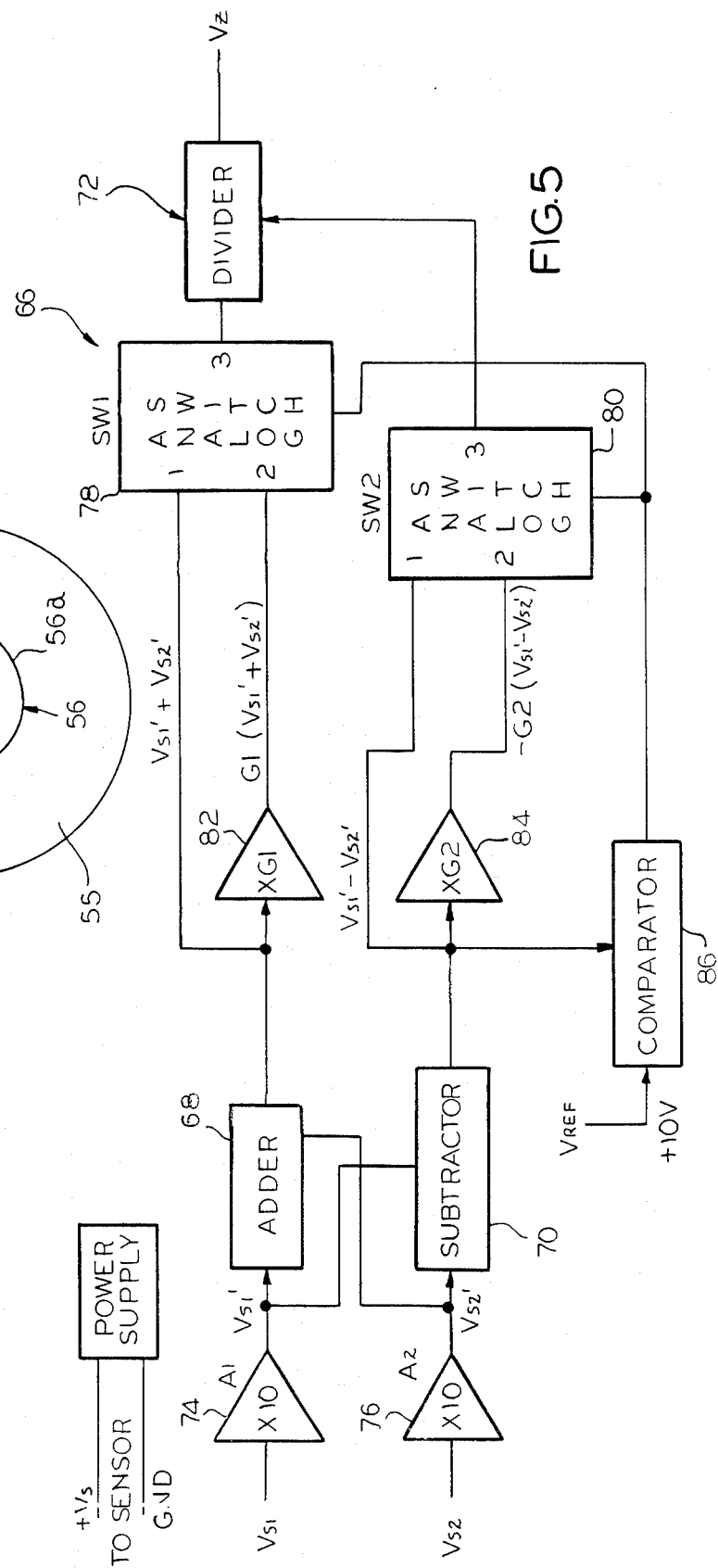

POWER AND TEMPERATURE INDEPENDENT MAGNETIC POSITION SENSOR FOR A ROTOR

FIELD OF THE INVENTION

The invention is directed to an apparatus for detecting the position of a rotor and, more particularly, to a power and temperature independent magnetic position sensor for a rotor.

BACKGROUND OF THE INVENTION

Generally speaking, it is important to be able to determine the angular position of a rotor in order to optimize electrical performance in brushless DC motors in terms of improved efficiency, power factor, and reduced current. For this purpose, it has been possible to determine the angular position of a rotor absolutely, but not accurately, with certain techniques such as with an absolute sensor that measures the distance between the sensor and a rotating wheel where the distance is continuously variable. While such an absolute sensor can be utilized where temperature variations are negligible, and is well suited for use as a counter for determining the number of revolutions, it is not well-suited where accuracy is important in an atmosphere of power supply and temperature variations.

In the past, it has been proposed to determine the angular position of a rotor in an accurate but not absolute sense by utilizing a stationary magnetic sensor. For instance, this has been proposed in Rothley, U.S. Pat. No. 4,506,217 which also senses speed, and in Sato et al, U.S. Pat. No. 4,369,405 which utilizes rotating magnet poles in an AC power generated apparatus. Further, in Glauert et al, U.S. Pat. No. 4,166,977, a rotary speed and angular position determining system is disclosed.

Still other position and speed detecting apparatus are disclosed in U.S. Pat. Nos. 4,370,614; 4,490,674; 4,481,469; 4,506,339; 4,359,685; and 3,728,565. However, it has remained to provide a power and temperature independent magnetic position sensor for a rotor.

The present invention is directed to overcoming the above-stated problems and accomplishing the stated objects.

SUMMARY OF THE INVENTION

Accordingly, the present invention is directed to a power and temperature independent magnetic position sensor for a rotor. The position sensor includes first and second magnetic sensing means for accurately determining the angular position of the rotor with the first and second magnetic sensing means comprising at least one target means operatively associated with the rotor so as to rotate therewith, first sensor means disposed at a variable distance from the target means dependent upon the angular position of the rotor to define a first air gap therebetween, and second sensor means disposed at a variable distance from the target means dependent upon the angular position of the rotor to define a second air gap therebetween. With this arrangement, the first and second sensor means cooperate with the target means to detect magnetic field intensity in the first and second air gaps, respectively.

Further, the first and second sensor means produce output signals indicative of the magnetic field intensity in the first and second air gaps. The magnetic field intensity in the first and second air gaps at any point in time is dependent upon the length of the first and second air gaps as determined by the position of the first and second sensor means relative to the target means at that point in time. Moreover, the output signals change in magnitude in a manner indicative of the magnetic field intensity by reason of changes in the length of the first and second air gaps.

Still further, the position sensor includes compensating means operatively associated with the first and second sensor means. The compensating means includes means for adding the output signals produced by the first and second sensor means, means for subtracting the output signals produced by the first and second sensor means, and means for dividing the added output signals by the subtracted output signals to produce a numerical value representative of the accurate angular position of the rotor. Because of the unique feature of the compensating means, the numerical value is independent of temperature and power supply.

In an exemplary embodiment, the first and second sensor means comprise first and second magnetic sensors mounted in fixed positions relative to the target means which in this embodiment preferably includes first and second wheels having generally smooth outer surfaces about the peripheries thereof. The wheels comprise first and second circular disks having continuously increasing radial dimensions with radial offsets on the outer surfaces at common points of maximum and minimum radial dimension. With this arrangement, the first and second magnetic sensors are disposed in respective common planes with the first and second circular disks in confronting but radially spaced relation to the outer surfaces such that the first magnetic sensor is always spaced from the first circular disk by a distance less than the distance the second magnetic sensor is spaced from the second circular disk.

In an alternative embodiment, the target means includes a single wheel having a generally smooth outer surface about the periphery thereof. The wheel again comprises a circular disk having a continuously increasing radial dimension and having a radial offset on the outer surface at a common point of maximum and minimum radial dimension with the first and second magnetic sensors being disposed in a common plane with the circular disk in confronting but radially spaced relation to the outer surface. Moreover, the first and second magnetic sensors are disposed in angularly spaced relation to one another so as to always be at a different distance from the outer surface of the circular disk.

In the preferred embodiment, the first and second air gaps are linearly variable. Moreover, the length of the first air gap is always less than the length of the second air gap so that the magnitude of the output signal produced by the first sensor means is alway greater than the magnitude of the output signal produced by the second sensor means. As a result, the difference between the output signals is always a positive numerical value greater than zero.

In the alternative embodiment, the first and second air gaps are also linearly variable. In addition, the length of the first air gap is normally but not always less than the length of the second air gap so that the magnitude of the output signal produced by the first sensor means is normally but not always greater than the magnitude of the output signal produced by the second sensor means. As a result, the difference between the output signals is normally but not always a positive numerical value greater than zero.

However, in the alternative embodiment, the difference between the output signals is a negative numerical value for a limited angular displacement of the rotor. In particular, this limited angular displacement will correspond to the angular separation of the first and second sensor means since the length of the second air gap will be less than the length of the first air gap for that limited period of time. As a result, the magnitude of the output signal produced by the second sensor means will be greater than the magnitude of the output signal produced by the first sensor means resulting in the negative numerical value.

During this limited angular displacement of the rotor, the added output signals are multiplied by a positive factor and the subtracted output signals are multiplied by a negative factor. These factors are selected to not only change the sign of the difference between the output signals to provide a positive numerical value but also to provide a very nearly linearly increasing numerical value throughout the 360° of rotation of the rotor. By so doing, the numerical value is representative of the accurate angular position of the rotor independent of power supply and temperature variations.

The present invention is also directed to a compensating circuit for accurately determining the angular position of a rotor with a magnetic position sensor independent of power supply and temperature variations. The circuit includes means for adding rotor angle-related linearly variable output signals from first and second sensor means of the magnetic position sensor and means for subtracting the rotor angle-related linearly variable output signals from the first and second sensor means of the magnetic position sensor. Moreover, the circuit includes means for dividing the added output signals by the subtracted output signals to produce a numerical value representative of the accurate angular position of the rotor independent of power supply and temperature variations.

Finally, the present invention is directed to a method for accurately determining the angular position of a rotor with a magnetic position sensor in a manner independent of power supply and temperature variations. The method includes the steps of adding rotor angle-related linearly variable output signals from first and second sensor means of the magnetic position sensor and subtracting the rotor angle-related linearly variable output signals from the first and second sensor means of the magnetic position sensor. Additionally, the method includes the step of dividing the added output signals by the subtracted output signals to produce a numerical value representative of the accurate angular position of the rotor independent of power supply and temperature variations.

Still other objects, advantages and features of the present invention will be appreciated from a consideration of the following specification taken in conjunction with the accompanying drawings.

BRIEF DESCRIPTION OF THE DRAWINGS

FIG. 4 is an elevational view of an alternative embodiment of power and temperature independent magnetic position sensor for a rotor; and FIG. 5 is a schematic of a compensating circuit for the position sensor illustrated in FIG. 4.

DETAILED DESCRIPTION OF THE PREFERRED EMBODIMENTS

Figure 1:
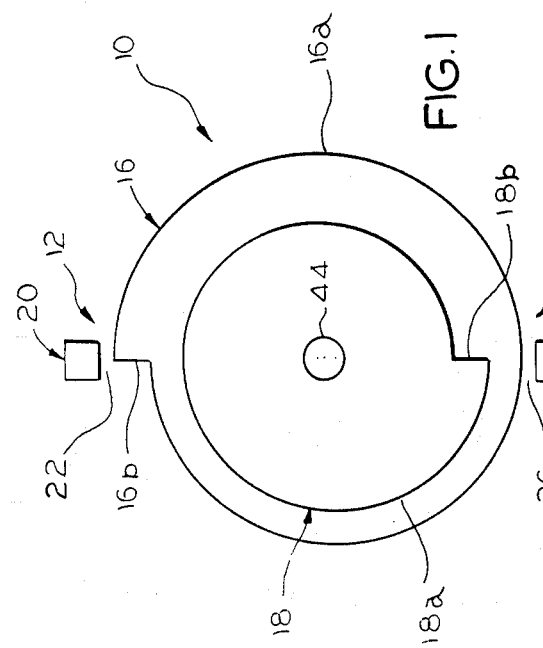
FIG. 1 is an end elevational view illustrating a power and temperature independent magnetic position sensor for a rotor in accordance with the present invention.

With reference first to FIG. 1, the reference numeral 10 designates generally a power and temperature independent magnetic position sensor for a rotor (not shown). The position sensor 10 includes first and second magnetic sensing means 12 and 14 for accurately determining the angular position of the rotor, and the first and second magnetic sensing means 12 and 14 include first and second target means 16 and 18 operatively associated with the rotor so as to rotate therewith, first sensor means 20 disposed at a variable distance from the first target means 16 dependent upon the angular position of the rotor to define a first linearly variable air gap 22 therebetween, and second sensor means 24 disposed at a variable distance from the second target means 18 dependent upon the angular position of the rotor to define a second linearly variable air gap 26 therebetween. With this arrangement, the first and second sensor means 20 and 24 cooperate with the first and second target means 16 and 18 to detect magnetic field intensity in the first and second air gaps 22 and 26, respectively (see, also, FIG. 2).

Figure 2:
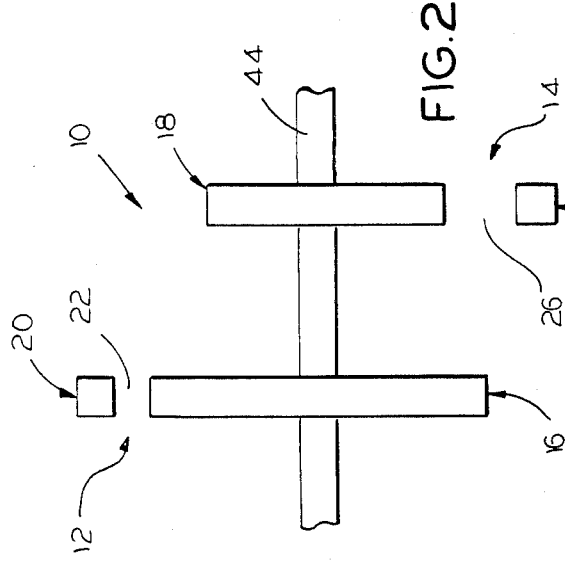
FIG. 2 is a front elevational view of the position sensor illustrated in FIG. 1.

Still referring to FIGS. 1 and 2, the first and second sensor means 20 and 24 produce output signals indicative of the magnetic field intensity in the first and second air gaps 22 and 26. The magnetic field intensity in the first and second air gaps 22 and 26 at any point in time is dependent upon the the length of the first and second air gaps as determined by the position of the first and second sensor means 20 and 24 relative to the first and second target means 16 and 18 at that point in time. In this connection, the output signals change in magnitude in a manner indicative of the magnetic field intensity by reason of changes in the length of the first and second air gaps 22 and 26.

With the arrangement illustrated in FIGS. 1 and 2, the length of the first air gap 22 is always less than the length of the second air gap 26. Thus, the magnitude of the output signal produced by the first sensor means 20 is always greater than the magnitude of the output signal produced by the second sensor means 24. As will be described hereinafter in some detail, this feature is advantageously utilized by compensating means 28 (see FIG. 3).

More specifically, the compensating means 28 is operatively associated with the first and second sensor means 20 and 24 which produce output signals $V_{S1}$ and $V_{S2}$, respectively. The compensating means 28 includes means 30 for adding the output signals produced by the first and second sensor means 20 and 24, means 32 for subtracting the output signals produced by the first and second sensor means 20 and 24, and means 34 for dividing the added output signals by the subtracted output signals to produce a numerical value $V_z$ representative of the accurate angular position of the rotor. Because of the unique features of the compensating means 28, the numerical value produced by the dividing means 34 is entirely independent of power supply and temperature variations.

Referring once again to FIGS. 1 and 2, the first and second target means 16 and 18 comprise first and second wheels having generally smooth outer surfaces 16a and 18a about the peripheries thereof. The first and second wheels 16 and 18 comprise first and second circular disks (compare FIGS. 1 and 2) having continuously increasing radial dimensions. As shown, the first and second circular disks 16 and 18 have radial offsets 16b and 18b on the outer surfaces 16a and 18a at common points of maximum and minimum radial dimension.

Referring specifically to FIG. 2, the first and second magnetic sensors 20 and 24 are disposed in respective common planes with the first and second circular disks 16 and 18. It will also be seen that the first and second magnetic sensors 20 and 24 are disposed in confronting but radially spaced relation to the outer surfaces 16a and 18a of the first and second circular disks 16 and 18. Moreover, as shown in FIG. 1, the first magnetic sensor 20 is always spaced from the first circular disk 16 by a distance less than the distance the second magnetic sensor 24 is spaced from the second circular disk 18.

Referring once again to FIG. 3, the compensating means 28 comprises an electrical circuit, the adding means 30 comprises an electronic adder in the electrical circuit, the subtracting means 32 comprises an electronic subtractor in the electrical circuit, and the dividing means 34 comprises an electronic divider in the electrical circuit. Further, the electrical circuit 28 preferably includes means for amplifying the output signals $V_{s1}$ and $V_{s2}$ produced by the first and second sensor means 20 and 24. In particular, the amplifying means includes a first amplifier 36 for receiving the output signal $V_{s1}$ produced by the first sensor means 20 and a second amplifier 38 for receiving the output signal $V_{s2}$ produced by the second sensor means 24 and, as shown, the first and second amplifiers 36 and 38 are disposed intermediate the first and second sensor means 20 and 24 and the electronic adder and subtractor 30 and 32.

Still further, the electrical circuit 28 includes means for multiplying the amplified and added output signals, i.e., $V_{s1}' + V_{s2}'$ and the subtracted output signals, i.e., $V_{s1}' - V_{s2}'$, including a first multiplier 40 for receiving the added output signals, i.e., $V_{s1}' + V_{s2}'$ from the electronic adder 30 and a second multiplier 42 for receiving the subtracted output signals i.e., $V_{s1}' - V_{s2}'$ from the electronic subtractor 32. As shown, the first and the second multipliers 40 and 42 are disposed intermediate the electronic adder and subtractor 30 and 32 and the electronic divider 34. In a preferred embodiment, the output signal $V_{s1}$ received by the first amplifier 36 is amplified by a gain of 10, the output signal $V_{s2}$ received by the second amplifier 38 is amplified by a gain of 10, the added output signals, i.e., $V_{s1}' + V_{s2}'$ received by the first multiplier 40 are scaled by a factor of 0.2, and the subtracted output signals, i.e., $V_{s1}' - V_{s2}'$ received by the second multiplier 42 are scaled by a factor of 1.0.

Figure 3:
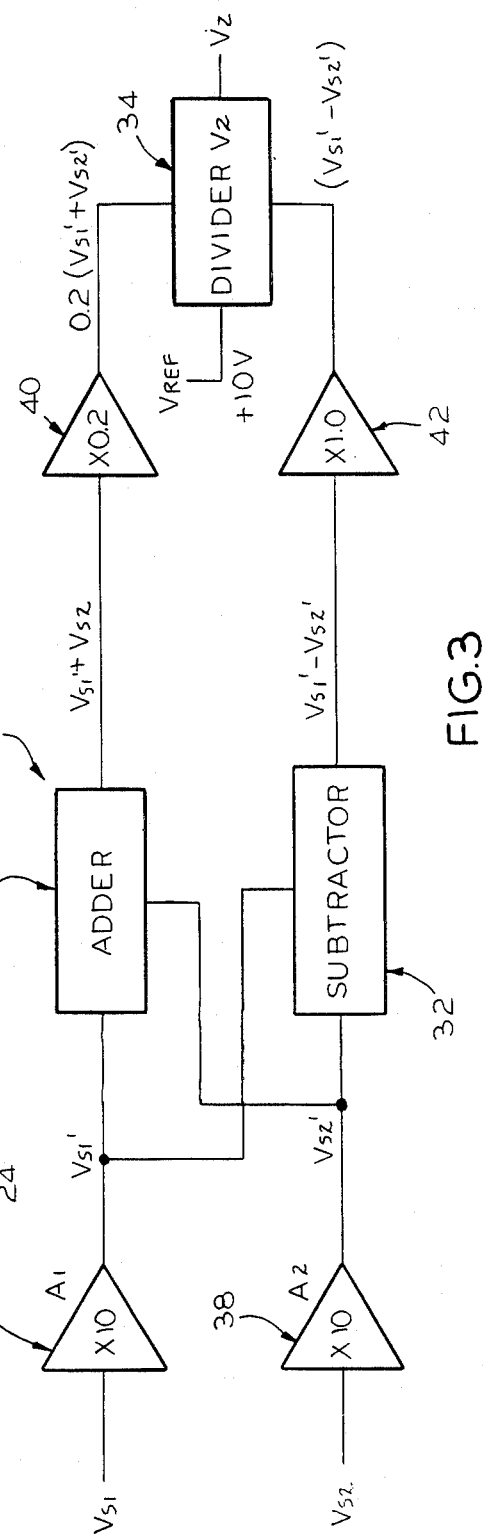
FIG. 3 is a schematic of a compensating circuit for the position sensor illustrated in FIG. 1.

For the embodiment illustrated in FIGS. 1-3, an example will clearly demonstrate the unique features of the invention. It will be seen that the first and second wheels 16 and 18 are fixed on a shaft 44 and adapted to rotate therewith and with a rotor operatively associated with the shaft (not shown), with the second wheel 18 having a maximum radius greater than the minimum radius of the first wheel 16 but with both the first and second wheels 16 and 18 having linearly increasing radii when rotated in the clockwise direction (or linearly decreasing radii when rotated in the counterclockwise direction). As a result, both of the first and second air gaps 22 and 26 decrease linearly when the first and second wheels 16 and 18 are rotated in the clockwise direction (or increase linearly when the first and second wheels 16 and 18 are rotated in the counterclockwise direction).

For purposes of this example, $V_{s1}$ output signals range from 87 mV to 100 mV for 0° through 359.9° of angular rotation of the first wheel 16 and $V_{s2}$ output signals range from 47 mV to 64 mV for 0° through 359.9° of angular rotation of the second wheel 18. The output signals $V_{s1}$ and $V_{s2}$ from the first and second sensors 20 and 24 are amplified by a gain of 10, the amplified output signals $V_{s1}'$ and $V_{s2}'$ are added and subtracted by the electronic adder 30 and electronic subtractor 32 simultaneously, the added output signals, i.e., $V_{s1}' + V_{s2}'$ are scaled by a factor of 0.2 and the subtracted output signals, i.e., $V_{s1}' - V_{s2}'$ are scaled by a factor of 1.0, after which the scaled outputs are fed into the electronic divider 34. At this stage, the numerical value representative of the accurate angular position of the rotor is determined by the formula:

$$V_z = \frac{0.2(V_{s1}' + V_{s2}')}{(V_{s1}' - V_{s2}')} \times 10V$$

where 10 V is the reference voltage.

With this formula, $V_z$ is a numerical value representative of the accurate angular position of the rotor. This value which, with the outputs assumed above, ranges from 6.7 at 0° to 8.4 at 360°, is a rotor angle-related linearly variable value. Moreover, the numerical value is independent of power supply and temperature variations as will be demonstrated hereinafter.

For instance, for a 10% increase in the output signals $V_{s1}$ and $V_{s2}$ produced by the first and second sensors 20 and 24, whether due to power supply and/or temperature variations:

$$V_{s1}' = (870 + 10\%)mV = 870 + 87 = 957mV$$

$$V_{s2}' = (470 + 10\%)mV = 470 + 47 = 517mV$$

$$V_{s1}' + V_{s2}' = 957 + 517 = 1474mV$$

$$0.2(V_{s1}' + V_{s2}') = 0.2(957 + 517) = 294.8mV$$

$$V_{s1}' - V_{s2}' = 957 - 517 = 440mV$$

$$V_z = \frac{0.2(V_{s1}' + V_{s2}')}{(V_{s1}' - V_{s2}')} \times 10V = \frac{294.8mV}{440mV} \times 10V = 6.7V$$

As previously mentioned, this is exactly the same numerical value already obtained for 0° and, thus, $V_z$ is independent of power supply and temperature variations.

Referring now to FIGS. 4 and 5, an alternative embodiment of power and temperature independent magnetic sensor 50 for a rotor is illustrated. The position sensor 50 includes first and second magnetic sensing means 52 and 54 for accurately determining the angular position of the rotor 55 including single target means 56 operatively associated with the rotor so as to rotate therewith, first sensor means 58 disposed at a variable distance from the target means 56 dependent upon the angular position of the rotor to define a first linearly variable air gap 60 therebetween, and second sensor means 62 disposed at a variable distance from the target means 56 dependent upon the angular position of the rotor to define a second linearly variable air gap 64 therebetween. As with the embodiment illustrated in FIGS. 1-3, the first and second sensor means 58 and 62 cooperate with the target means 56 to detect magnetic field intensity in the first and second air gaps 60 and 64, respectively.

Also, as before, the first and second sensor means 58 and 62 produce output signals $V_{s1}$ and $V_{s2}$ indicative of the magnetic field intensity in the first and second air gaps 60 and 64. The magnetic field intensity in the first and second air gaps 60 and 64 at any point in time is dependent upon the length of the first and second air gaps as determined by the position of the first and second sensor means 58 and 62 relative to the target means 56 at that point in time. Further, the output signals $V_{s1}$ and $V_{s2}$ change in magnitude in a manner indicative of the magnetic field intensity by reason of changes in the length of the first and second air gaps 60 and 64.

With the embodiment illustrated in FIGS. 4 and 5, the length of the first air gap 60 is normally less than the length of the second air gap 64. Thus, the magnitude of the output signal $V_{s1}$ produced by the first sensor means 58 is normally greater than the magnitude of the output signal $V_{s2}$ produced by the second sensor means 64. As a result, a positive numerical value $V_z$ is normally produced by a compensating means 66 operatively associated with the first and second sensor means 58 and 62 (see FIG. 5).

Still referring to FIG. 5, the compensating means 66 receives the output signals $V_{s1}$ and $V_{s2}$ from the first and second sensor means 58 and 62. The compensating means 66 includes means 68 for adding the output signals produced by the first and second sensor means 58 and 62, means 70 for subtracting the output signals produced by the first and second sensor means 58 and 62, and means 72 for dividing the added output signals by the subtracted output signals. In this manner, the dividing means 72 produces a numerical value representative of the accurate angular position of the rotor 55 independent of power supply and temperature variations.

As with the embodiment illustrated in FIGS. 1–3, the first and second sensor means 58 and 62 preferably comprise first and second magnetic sensors mounted in fixed positions relative to the target means 56. It will also be appreciated by referring to FIG. 4 that the target means 56 comprises a single wheel having a generally smooth outer surface 56a about the periphery thereof, and the wheel 56 comprises a circular disk having a continuously increasing radial dimension with a radial offset 56b on the outer surface 56a at a common point of maximum and minimum radial dimension. With this arrangement, the first and second magnetic sensors 58 and 62 are disposed in a common plane with the circular disk 56 in confronting but radially spaced relation to the outer surface 56a.

Still referring to FIG. 4, the first and second magnetic sensors 58 and 62 are also disposed in angularly spaced relation to one another by an angle of $\theta°$. Further, the first magnetic sensor 58 is always spaced from the circular disk 56 by a distance different from the distance the second magnetic sensor 62 is spaced from the circular disk 56. In this manner, the output signals $V_{s1}$ and $V_{s2}$ supplied to the compensating means 66 will always be of a different numerical value.

Referring now to FIG. 5, the compensating means 66 comprises an electrical circuit, the adding means 68 comprises an electronic adder in the electrical circuit 66, the subtracting means 70 comprises an electronic subtractor in the electrical circuit 66, and the dividing means 72 comprises an electronic divider in the electrical circuit 66. It will also be seen that the electrical circuit 66 includes means for amplifying the output signals $V_{s1}$ and $V_{s2}$ produced by the first and second sensor means 58 and 62. More particularly, the amplifying means includes a first amplifier 74 for receiving the output signal $V_{s1}$ produced by the first sensor means 58 and a second amplifier 76 for receiving the output signal $V_{s2}$ produced by the second sensor means 62, and the first and second amplifiers 74 and 76 are disposed intermediate the first and second sensor means 58 and 62 and the electronic adder and subtractor 68 and 70.

As further shown in FIG. 5, the electrical circuit 66 includes switch means comprising a first analog switch 78 and a second analog switch 80. The first analog switch 78 is disposed intermediate the electronic adder 68 and the electronic divider 72 and receives the added output signals directly from the electronic adder 68 as a first input to the first analog switch 78 and indirectly from the electronic adder 68 after the added output signals have been multiplied by a first multiplier 82 as a second input to the first analog switch 78. The second analog switch 80 is disposed intermediate the electronic subtractor 70 and the electronic divider 72 and receives the subtracted output signals directly from the electronic subtractor 70 as a first input to the second analog switch 80 and indirectly from the electronic subtractor 70 after the subtracted output signals have been multiplied by a second multiplier 84 as a second input to the second analog switch 80. As shown, the first and second multipliers 82 and 84 are disposed intermediate the electronic adder and subtractor 68 and 70 and the first and second analog switches 78 and 80, respectively.

Still further, the electrical circuit 66 includes a comparator 86 adapted to receive the subtracted output signals directly from the electronic subtractor 70. The comparator is also operatively associated with the first and second analog switches 78 and 80 to cause either the first inputs or the second inputs to the first and second analog switches 78 and 80 to be received by the electronic divider 72. More specifically, the comparator 86 causes the second inputs to be received by the electronic divider 72 when the subtracted output signals is a negative value.

In a preferred embodiment of the electrical circuit 66, the output signal $V_{s1}$ received by the first amplifier 74 is amplified by a gain of 10, the output signal $V_{s2}$ received by the second amplifier 76 is amplified by a gain of 10, the added output signals, i.e., $V_{s1}'+V_{s2}'$ received by the first multiplier 82 are scaled by a factor of G1, and the subtracted output signals, i.e., $V_{s1}'-V_{s2}'$ received by the second multiplier 84 are scaled by a factor of $-G2$. As will be appreciated, this negative scaling factor changes the sign of the difference to a positive numerical value in the event that $V_{s2}'$ is greater than $V_{s1}'$ which would otherwise cause the difference to be a negative value, and the comparator 86 also multiplies the numerical value produced by dividing the added output signals, i.e., $V_{s1}'+V_{s2}'$ or G1 $(V_{s1}'+V_{s2}')$ by the subtracted output signals, i.e., $V_{s1}'-V_{s2}'$ or $-G2$ $(V_{s1}'-V_{s2}')$ by a reference voltage of 10 volts.

With the embodiment illustrated in FIGS. 4 and 5, the first and second magnetic sensors 58 and 62 are spaced apart by an angle of $\theta°$ and the length of the first and second air gaps 60 and 64 can be designated $d_1$ and $d_2$ respectively. Assuming that the minimum value of $d_1$ is equal to the minimum value of $d_2$, the output signals of the first and second magnetic sensors 58 and 62, i.e., $V_{s1}$ and $V_{s2}$, will be exactly the same but slightly displaced in time by the angle $\theta°$ when the circular disk 56 rotates and the first and second magnetic sensors 58 and 62 are stationary (or vise-versa). Assuming also that the circular disk 56 has a linearly increasing radial dimension which means that the lengths $d_1$ and $d_2$ of the first and second air gaps 60 and 64 increase linearly, the output signal $V_{s1}$ for a given magnetic field strength is proportional to the length $d_1$ of the first air gap 60. As a result, the output signal $V_{s1}$ will increase linearly and, by the same reasoning, the output signal $V_{s2}$ will increase linearly; hence, the output signal $V_{s1}$ and $V_{s2}$ will take on the same values but at different times over one complete revolution.

By way of example, arbitrarily assuming the first and second magnetic sensors 58 and 62 to be angularly displaced by 40°:

So $\quad \theta = 40°$
Let $d_1$ max give $\quad V_{s1} = 1mV/V_s = 0°$
and $d_1$ min give $\quad V_{s1} = 10mV/V_s = 359.9°$ Similarly:

$d_2$ max gives $\quad V_{s2} = 1mV/V_s = 0°$
$d_2$ min gives $\quad V_{s2} = 10mV/V_s = 359.9°$ where $V_s$ is the power supply voltage to the first and second magnetic sensors 58 and 62.

As will be appreciated, the electrical circuit 66 eliminates any impact of the power supply voltage because:

$$V_z = \frac{\frac{V_{s2}}{V_s} + \frac{V_{s1}}{V_s}}{\frac{V_{s2}}{V_s} - \frac{V_{s1}}{V_s}} \times V_{Ref}$$

$$= \frac{V_{s2} + V_{s1}}{V_{s2} - V_{s1}} \times V_{Ref}$$

where $V_{Ref}$ = the reference voltage of the electronic divider 72. As a result, the power supply voltage has been eliminated from the numerical value $V_z$.

Similarly, temperature variations have been eliminated by the electrical circuit 66 as having any effect on the numerical value $V_z$. For instance, assuming that the output signal $V_{s1}$ increases (or decreases) by 20% due to a change in temperature, the output signal $V_{s2}$ will also increase (or decrease) by 20% because both of the first and second magnetic sensors 58 and 62 are at the same temperature. As a result, if $V_{s1} = 4$ mV/V and $V_{s2} = 5$ mV/V at a given angle e.g., 120°, then $V_{s1} + 20\% = 4.8$ mV/V and $V_{s2} + 20\% = 6$ mV/V and in either case $V_z = 9$ V because $$V_z = \frac{5 + 4}{5 - 4} = 9V \text{ and}$$

$$V_z = \frac{6 + 4.8}{6 - 4.8} = 9V$$

where $V_{Ref} = 1V$

As will be appreciated, the same result will hold true if $V_{s1}$ and $V_{s2}$ are increased by reason of a power supply variation.

For a given angular displacement $\theta°$, a unique linear relationship exists between the angular position of the rotor and the numerical value $V_z$. However, the angular displacement $\theta°$ should be sufficiently large so that the signal-to-noise ratio of the difference between $V_{s1}$ and $V_{s2}$ is sufficiently large to ignore the noise. In particular, the difference should be at least 10% of the maximum output of the first and second magnetic sensors 58 and 62.

As will be appreciated, if the displacement $\theta°$ is 40°, a negative numerical value will be obtained when the angular position of the rotor is between 320° and 359.9°. This negative numerical value can be changed to a positive numerical value by means of the unique electrical circuit 66 illustrated in FIG. 5. In other words, the comparator 86 signals the first and second analog switches 78 and 80 to pass the second inputs G1 $(V_{s1}' + V_{s2}')$ and $-G2$ $(V_{s1}' - V_{s2}')$ to the electronic divider 72 to insure a positive numerical value $V_z$.

While it has been assumed that the first and second air gaps 60 and 64 are linearly decreasing in length, this is not essential to the operation of the position sensor 50. However, it is important that the first and second air gaps 60 and 64 decrease (or increase if the motor is reversed) in such a way that the length varies linearly. Further, the first and second magnetic sensors 58 and 62 need not be placed exactly the same distance from the radial offset 56b although this may be selected for purposes of simplicity.

In operation, the addition and subtraction by the electronic adder 68 and the electronic subtractor 70 takes place substantially simultaneously. The added output signals, i.e., $V_{s1}' + V_{s2}'$ is fed into the first analog switch 78 directly and also into the multiplier 82 having a gain G1 after which the added and scaled output signals, i.e., G1 $(V_{s1}' + V_{s2}')$ is fed into the first analog switch 78. The subtracted output signals, i.e., $V_{s1}' - V_{s2}'$ is also fed into the second analog switch 80 directly and further into the multiplier 84 having a gain $-G2$ after which the added and scaled output signals, i.e., $-G2$ $(V_{s1}' - V_{s2}')$ is also fed into the second analog switch 80. Moreover, the subtracted output signals, i.e., $V_{s1}' - V_{s2}'$ is fed to the comparator 86 which will allow either the first inputs, i.e., $V_{s1}' + V_{s2}'$ and $V_{s1}' - V_{s2}'$ or the second inputs, i.e., G1 $(V_{s1}' + V_{s2}')$ and $-G2$ $(V_{s1}' - V_{s2}')$ to be fed to the numerator and denominator inputs, respectively, of the electronic divider 72.

Thus, when the subtracted output signals, i.e., $V_{s1}' - V_{s2}'$ of the electronic subtractor 70 are positive, e.g., between 0° and 320° where $\theta = 40°$, the comparator 86 will allow the first inputs, i.e., $V_{s1}' + V_{s2}'$ and $V_{s1}' - V_{s2}'$ to be fed into the electronic divider 72. Further, when the output signals, i.e., $V_{s1}' - V_{s2}'$ of the electronic subtractor 70 is negative, e.g., between 320° and 359.9° where $\theta = 40°$, the comparator 86 will allow the second inputs, i.e., G1 $(V_{s1}' + V_{s2}')$ and $-G2$ $(V_{s1}' - V_{s3}')$ to be fed into the electronic divider 72.

In a preferred embodiment of the position sensor 50, the multiplier 82 has a gain of G1 and the multiplier 84 has a gain of $-G2$ in which case:

$$V_z = \frac{G1\,(V_{s1}' + V_{s2}')}{-G2\,(V_{s1}' - V_{s2}')} \times V_{Ref}$$

$$= \frac{G1}{-G2} \frac{(V_{s1}' + V_{s2}')}{(V_{s1}' - V_{s2}')} \times V_{Ref}$$

When the comparator 86 selects the second inputs, i.e., G1 $(V_{s1}' + V_{s2}')$ and $-G2$ $(V_{s1}' - V_{s2}')$, the result is to change a negative numerical value into a positive numerical value. Moreover, the scaling factors G1 and −G2 only serve to change the negative value to a positive value and to change the magnitude of the output by a fixed constant to thereby approximate a linear relationship between the angular position of the rotor and the resulting numerical value $V_z$. Furthermore, this numerical value $V_z$ is entirely independent of power supply and temperature variations.

As will now be appreciated, the present invention is also directed to a unique compensating circuit 28 or 66 for accurately determining the angular position of a rotor such as 55 with a magnetic position sensor 10 or 50 independent of power supply and temperature variations. The compensating circuit 28 or 66 includes means 30 or 68 for adding rotor angle-related linearly variable output signals $V_{s1}$ and $V_{s2}$ from first and second sensor means 20 or 58 and 24 or 62 of the respective magnetic position sensors 10 or 50. It also includes means 32 or 70 for subtracting the rotor angle-related linearly variable output signals $V_{s1}$ and $V_{s2}$ from the first and second sensor means 20 or 58 and 24 or 62 of the respective magnetic position sensors 10 or 50. The compensating circuit 28 or 66 also includes means 34 or 72 for dividing the added output signals, i.e., $V_{s1}+V_{s2}$ by the subtracted output signals, i.e., $V_{s1}-V_{s2}$ to produce a numerical value representative of the accurate angular position of the rotor such as 55. By reason of the unique compensating circuit 28 or 66, the numerical value is entirely independent of power supply and temperature variations.

Finally, the present invention is directed to a method for accurately determining the angular position of a rotor such as 55 with a magnetic position sensor 10 or 50 independent of power supply and temperature variations. The method includes the step of adding rotor angle-related linearly variable output signals $V_{s1}$ and $V_{s2}$ from first and second sensor means 20 or 58 and 24 or 62 of the respective magnetic position sensors 10 or 50. It also includes the step of subtracting the rotor angle-related linearly variable output signals $V_{s1}$ and $V_{s2}$ from the first and second sensor means 20 or 58 and 24 or 62 of the respective magnetic position sensors 10 or 50. The method further includes the step of dividing the added output signals, i.e., $V_{s1}$ and $V_{s2}$ by the subtracted output signals, i.e., $V_{s1}-V_{s2}$ to produce a numerical value representative of the accurate angular position of the rotor such as 55. By following these steps, the method produces a numerical value which is entirely independent of power supply and temperature variations.

While in the foregoing there have been set forth preferred embodiments of the invention, it will be understood that the details herein given may be varied by those skilled in the art without departing from the spirit and scope of the invention as defined by the appended claims.

I claim:

1. A power and temperature independent magnetic position sensor for a rotor, comprising:

first and second magnetic sensing means for accurately determining the angular position of said rotor, said first and second magnetic sensing means including at least one disk shaped target means having a continuously increasing radial dimension and being fixedly mounted in operatively associated relation to said rotor so as to rotate therewith, first sensor means fixedly mounted in spaced relation to the periphery of said target means and disposed at a variable distance from said target means dependent upon the angular position of said rotor to define a first air gap therebetween, and second sensor means fixedly mounted in spaced relation to the periphery of said target means and disposed at a variable distance from said target means dependent upon the angular position of said rotor to define a second air gap therebetween, said first and second sensor means cooperating with said target means to detect magnetic field intensity in said first and second air gaps, respectively;

said first and second sensor means producing output signals indicative of said magnetic field intensity in said first and second air gaps, said magnetic field intensity in said first and second air gaps at any point in time being dependent upon the length of said first and second air gaps as determined by the position of said first and second sensor means relative to said target means at that point in time, said output signals changing in magnitude in a manner indicative of said magnetic field intensity by reason of changes in the length of said first and second air gaps; and compensating means operatively associated with said first and second sensor means, said compensating means including means for adding said output signals produced by said first and second sensor means, means for subtracting said output signals produced by said first and second sensor means, and means for dividing said added output signals by said subtracted output signals to produce a numerical value representative of the accurate angular position of said rotor, said numerical value being independent of power supply and temperature variations.

2. The position sensor as defined by claim 1 wherein said first and second sensor means comprise first and second magnetic sensors mounted in fixed positions relative to said target means.

3. The position sensor as defined by claim 2 wherein said target means includes first and second wheels having generally smooth outer surfaces about the peripheries thereof, said first and second wheels comprising first and second circular disks having continuously increasing radial dimensions, said first and second circular disks having radial offsets on said outer surfaces at common points of maximum and minimum radial dimension.

4. The position sensor as defined by claim 3 wherein said first and second magnetic sensors are disposed in respective common planes with said first and second circular disks, said first and second magnetic sensors being disposed in confronting but radially spaced relation to said outer surfaces of said first and second circular disks, said first magnetic sensor always being spaced from said first circular disk by a distance less than the distance said second magnetic sensor is spaced from said second circular disk.

5. The position sensor as defined by claim 2 wherein said target means includes a single wheel having a generally smooth outer surface about the periphery thereof, said wheel comprising a circular disk having a continuously increasing radial dimension, said circular disk having a radial offset on said outer surface at a common point of maximum and minimum radial dimension.

6. The position sensor as defined by claim 5 wherein said first and second magnetic sensors are disposed in a common plane with said circular disk, said first and second magnetic sensors being disposed in confronting but radially spaced relation to said outer surface of said circular disk and in angularly spaced relation to one another, said first magnetic sensor always being spaced from said circular disk by a distance different from the distance said second magnetic sensor is spaced from said circular disk.

7. A power and temperature independent magnetic position sensor for a rotor, comprising:

first and second magnetic sensing means for accurately determining the angular position of said rotor, said first and second magnetic sensing means including first and second disk shaped target means each having a continuously increasing radial dimension and each being fixedly mounted in operatively associated relation to said rotor so as to rotate therewith, first sensor means fixedly mounted in spaced relation to the periphery of said first target means and disposed at a variable distance from said first target means dependent upon the angular position of said rotor to define a first linearly variable air gap therebetween, and second sensor means fixedly mounted in spaced relation to the periphery of said second target means and disposed at a variable distance from said second target means dependent upon the angular position of said rotor to define a second linearly variable air gap therebetween, said first and second sensor means cooperating with said first and second target means to detect magnetic field intensity in said first and second air gaps, respectively;

said first and second sensor means producing output signals indicative of said magnetic field intensity in said first and second air gaps, said magnetic field intensity in said first and second air gaps at any point in time being dependent upon the length of said first and second air gaps as determined by the position of said first and second sensor means relative to said first and second target means at that point in time, said output signals changing in magnitude in a manner indicative of said magnetic field intensity by reason of changes in the length of said first and second air gaps;

the length of said first air gap always being less than the length of said second air gap so that the magnitude of said output signal produced by said first sensor means is always greater than the magnitude of said output signal produced by said second sensor means; and compensating means operatively associated with said first and second sensor means, said compensating means including means for adding said output signals produced by said first and second sensor means, means for subtracting said output signals produced by said first and second sensor means, and means for dividing said added output signals by said subtracted output signals to produce a numerical value representative of said accurate angular position of said rotor, said numerical value being independent of power supply and temperature variations.

8. The position sensor as defined by claim 7 wherein said first and second target means include first and second wheels having generally smooth outer surfaces about the peripheries thereof, said first and second wheels comprising first and second circular disks having continuously increasing radial dimensions, said first and second circular disks having radial offsets on said outer surfaces at common points of maximum and minimum radial dimension.

9. The position sensor as defined by claim 8 wherein said first and second magnetic sensors are disposed in respective common planes with said first and second circular disks, said first and second magnetic sensors being disposed in confronting but radially spaced relation to said outer surfaces of said first and second circular disks, said first magnetic sensor always being spaced from said first circular disk by a distance less than the distance said second magnetic sensor is spaced from said second circular disk.

10. The position sensor as defined by claim 7 wherein said compensating means comprises an electrical circuit, said adding means includes an electronic adder in said electrical circuit, said subtracting means includes an electronic subtractor in said electrical circuit, and said dividing means includes an electronic divider in said electrical circuit.

11. The position sensor as defined by claim 10 including means for amplifying said output signals produced by said first and second sensor means, said amplifying means including a first amplifier for receiving said output signal produced by said first sensor means and a second amplifier for receiving said output signal produced by said second sensor means, said first and second amplifiers being disposed intermediate said electronic adder and subtractor and said first and second sensor means.

12. The position sensor as defined by claim 11 including means for multiplying said added outut signals and said subtracted output signals, said multiplying means including a first multiplier for receiving said added output signals from said electronic adder and a second multiplier for receiving said subtracted output signals from said electronic subtractor, said first and second multipliers being disposed intermediate said electronic divider and said electronic adder and subtractor.

13. The position sensor as defined by claim 12 wherein said output signal received by said first amplifier is amplified by a gain of 10, said output signal received by said second amplifier is amplified by a gain of 10, said added output signals received by said first multiplier are scaled by a factor of 0.2, and said subtracted output signals received by said second multiplier are scaled by a factor of 1.0.

14. The position sensor as defined by claim 13 wherein said electronic divider also multiplies said numerical value produced by dividing said amplified and multiplied output signals by said amplified and multiplied subtracted output signals by a reference voltage of 10 volts.

15. A power and temperature independent magnetic position sensor for a rotor comprising:

first and second magnetic sensing means for accurately determining the angular position of said rotor, said first and second magnetic sensing means including single disk shaped target means having a continuously increasing radial dimension and being fixedly mounted in operatively associated relation to said rotor so as to rotate therewith, first sensor means fixedly mounted in spaced relation to the periphery of said target means in a manner so as to be disposed at a variable distance from said target means dependent upon the angular position of said rotor to define a first linearly variable air gap therebetween, and second sensor means fixedly mounted in spaced relation to the periphery of said target means in a manner so as to be disposed at a variable distance from said target means dependent upon the angular position of said rotor to define a second linearly variable air gap therebetween, said first and second sensor means cooperating with said target means to detect magnetic field intensity in said first and second air gaps, respectively;

said first and second sensor means producing output signals indicative of said magnetic field intensity in said first and second air gaps, said magnetic field intensity in said first and second air gaps at any point in time being dependent upon the length of said first and second air gaps as determined by the position of said first and second sensor means relative to said target means at that point in time, said output signals changing in magnitude in a manner indicative of said magnetic field intensity by reason of changes in the length of said first and second air gaps;

the length of said first air gap normally being less than the length of said second air gap so that the magnitude of said output signal produced by said first sensor means is normally greater than the magnitude of said output signal produced by said second sensor means; and p1 compensating means operatively associated with said first and second sensor means, said compensating means including means for adding said output signals produced by said first and second sensor means, means for subtracting said output signals produced by said first and second sensor means, and means for dividing said output signals by said subtracted output signals to produce a numerical value representative of the accurate angular position of said rotor, said numerical value being independent of power supply and temperature variations.

16. The position sensor as defined by claim 15 wherein said first and second sensor means comprise first and second magnetic sensors mounted in fixed positions relative to said target means.

17. The position sensor as defined by claim 16 wherein said target means includes a single wheel having a generally smooth outer surface about the periphery thereof, said wheel comprising a circular disk having a continuously increasing radial dimension, said circular disk having a radial offset on said outer surface at a common point of maximum and minimum radial dimension.

18. The position sensor as defined by claim 17 wherein said first and second magnetic sensors are disposed in a common plane with said circular disk, said first and second magnetic sensors being disposed in confronting but radially spaced relation to said outer surface of said circular disk and in angularly spaced relation to one another, said first magnetic sensor always being spaced from said circular disk by a distance different from the distance said second magnetic sensor is spaced from said circular disk.

19. The position sensor as defined by claim 15 wherein said compensating means includes an electrical circuit, said adding means includes an electronic adder in said electrical circuit, said subtracting means includes an electronic subtractor in said electrical circuit, and said dividing means includes an electronic divider in said electrical circuit.

20. The position sensor as defined by claim 19 including means for amplifying said output signals produced by said first and second sensor means, said amplifying means including a first amplifier for receiving said output signal produced by said first sensor means and a second amplifier for receiving said output signal produced by said second means, said first and second amplifiers being disposed intermediate said electronic adder and subtractor and said first and second sensor means.

21. The position sensor as defined by claim 20 including switch means comprising a first analog switch and a second analog switch, said first analog switch being disposed intermediate said electronic adder and said electronic divider and receiving said added output signals directly from said electronic adder as a first input to said first analog switch and indirectly from said electronic adder after said added output signals have been multiplied by a first multiplier as a second input to said first analog switch, said second analog switch being disposed intermediate said electronic subtractor and said electronic divider and receiving said subtracted output signals directly from said electronic subtractor as a first input to said second analog switch and indirectly from said electronic subtractor after said subtracted output signals have been multiplied by a second multiplier as a second input to said second analog switch, said first and second multipliers being disposed intermediate said first and second analog switches and said electronic adder and subtractor.

22. The position sensor as defined by claim 21 including a comparator adapted to receive said subtractor output signals directly from said electronic subtractor, said comparator being operatively associated with said first and second analog switches to cause either said first inputs or second inputs to said first and second analog switches to be received by said electronic divider, said comparator causing said second inputs to be received by said electronic divider when said subtracted output signals is a negative value.

23. The position sensor as defined by claim 22 wherein said output signal received by said first amplifier is amplified by a gain of 10, said output signal received by said second amplifier is amplified by a gain of 10, said added output signals received by said first multiplier are scaled by a factor of G1, and said subtracted output signals received by said second multiplier are scaled by a factor of $-G2$.

24. The position sensor as defined by claim 23 wherein said comparator also multiplies said numerical value produced by dividing said added output signals by said subtracted output signal by a reference voltage of 10 volts.

25. In a compensating circuit for accurately determining the angular position of a rotor with a magnetic position sensor independent of power supply and temperature variations, said magnetic position sensor including first and second magnetic sensing means for accurately determining the annular position of said rotor, said first and second magnetic sensing means including at least one disk shaped target means having a continuously increasing radial dimension and being fixedly mounted in operatively associated relation to said rotor so as to rotate therewith, first sensor means fixedly mounted in spaced relation to the periphery of said target means and disposed at a variable distance from said target means dependent upon the angular position of said rotor to define a first air gap therebetween, and second sensor means fixedly mounted in spaced relation to the periphery of said target means and disposed at a variable distance from said target means dependent upon the angular position of said rotor to define a second air gap therebetween, said first and second sensor means cooperating with said target means to detect magnetic field intensity in said first and second air gaps, the improvement comprising:

means for adding output signals from said first and second sensor means of said magnetic position sensor, said output signals being indicative of said magnetic field intensity in said first and second air gaps and said adding means being operatively associated with said first and second sensor means;

means for subtracting said output signals from said first and second sensor means of said magnetic position sensor, said output signals changing in magnitude with changes in the length of said first and second air gaps and said subtracting means being operatively associated with said first and second sensor means; and means operatively associated with said adding and subtracting means for dividing said added output signals by said subtracted output signals to produce a numerical value representative of the accurate angular position of said rotor;

said numerical value being independent of power supply and temperature variations.

26. The compensating circuit as defined by claim 25 wherein said adding means includes an electronic adder, said subtracting means includes an electronic subtractor, and said dividing means includes an electronic divider.

27. The compensating circuit as defined by claim 26 including a first amplifier for amplifying said output signal from said first sensor means before said output signals are added by said electronic adder and subtracted by said electronic subtractor and a second amplifier for amplifying said output signal from said second sensor means before said output signals are added by said electronic adder and subtracted by said electronic subtractor.

28. The compensating circuit as defined by claim 27 including means for multiplying said added output signals and said subtracted output signals, said multiplying means including a first multiplier for receiving said added output signals from said electronic adder and a second multiplier for receiving said subtracted output signals from said electronic subtractor, said first and second multipliers being disposed intermediate said electronic divider and said electronic adder and subtractor.

29. The compensating circuit as defined by claim 28 wherein said output signal received by said first amplifier is amplified by a gain of 10, said output signal received by said second amplifier is amplified by a gain of 10, said added output signals received by said first multiplier are scaled by a factor of 0.2, and said subtracted output signals received by said second multiplier are scaled by a factor of 1.0.

30. The compensating circuit as defined by claim 29 wherein said electronic divider also multiplies said numerical value produced by dividing said amplified and multiplied added output signals by said amplified and multiplied subtracted output signals by a reference voltage of 10 volts.

31. The compensating circuit as defined by claim 27 including switch means comprising a first analog switch and a second analog switch, said first analog switch being disposed intermediate said electronic adder and said electronic divider and receiving said added output signals directly from said electronic adder as a first input to said first analog switch and indirectly from said electronic adder after said added output signals have been multiplied by a first multiplier as a second input to said first analog switch, said second analog switch being disposed intermediate said electronic subtractor and said electronic divider and receiving said subtracted output signals directly from said electronic subtractor as a first input to said second analog switch and indirectly from said electronic subtractor after said subtracted output signals have been multiplied by a second multiplier as a second input to said second analog switch, said first and second multipliers being disposed intermediate said first and second analog switches and said electronic adder and subtractor.

32. The compensating circuit as defined by claim 31 including a comparator adapted to receive said subtracted output signals directly from said electronic subtractor, said comparator being operatively associated with said first and second analog switches to cause either said first inputs or said second inputs to said first and second analog switches to be received by said electronic divider, said comparator causing said second inputs to be received by said electronic divider when said subtracted output signals is a negative value.

33. The compensating circuit as defined by claim 32 wherein said output signal received by said first amplifier is amplified by a gain of 10, said output signal received by said second amplifier is amplified by a gain of 10, said added output signals received by said first multiplier are scaled by a factor of G1, and said subtracted output signals received by said second multiplier are scaled by a factor of −G2.

34. The compensating circuit as defined by claim 33 wherein said comparator also multiplies said numeric value produced by dividing said added output signals by said subtracted output signals by a reference voltage of 10 volts.

35. A method for accurately determining the angular position of a rotor with a magnetic position sensor, said magnetic position sensor including first and second ensor means disposed relative to target means operatively associated with said rotor to rotate therewith to define first and second air gaps therebetween, respectively, the angular position being determined independent of power supply and temperature variations, comprising the steps of:

adding rotor angle-related linearly variable output signals from said first and second sensor means of said magnetic position sensor, said output signals being indicative of said magnetic field intensity in said first and second air gaps;

subtracting said rotor angle-related linearly variable output signals from said first and second sensor means of said magnetic position sensor, said output signals changing in magnitude with changes in the length of said first and second air gaps;

said output signals being dependent upon the angular position of said rotor at any point in time; and dividing said added output signals by said subtracted output signals to produce a numerical value representative of the accurate angular position of said rotor;

said numerical value being independent of power supply and temperature variations.

36. The method of accurately determining the angular position of a rotor as defined by claim 35 wherein said output signal from said first sensor means is amplified before said output signals are added and subtracted and said output signal from said second sensor means is amplified before said output signals are added and subtracted.

37. The method for accurately determining the angular position of a rotor as defined by claim 36 wherein said added output signals and said subtracted output signals are multiplied before said added output signals are divided by said subtracted output signals.

38. The method for determining the angular position of a rotor as defined by claim 37 wherein said output signal from said first sensor means is amplified by a gain of 10, said output signal from said second sensor means is amplified by a gain of 10, said added output signals are scaled by a factor of 0.2, and said subtracted output signals are scaled by a factor of 1.0.

39. The method of accurately determining the angular position of a rotor as defined by claim 38 wherein said numerical value produced by dividing said amplified and multiplied output signals by said amplified and multiplied subtracted output signals is further multiplied by a reference voltage of 10 volts.

40. The method for accurately determining the angular position of a rotor as defined by claim 36 including the step of providing a first analog switch for receiving said added output signals directly as a first input to said first analog switch and indirectly after said added output signals have been multiplied as a second input to said first analog switch, and including the step of providing a second analog switch for receiving said subtracted output signals directly as a first input to said second analog switch and indirectly after said subtracted output signals have been multiplied as a second input to said second analog switch.

41. The method for determining the angular position of a rotor as defined by claim 40 including the step of providing a comparator adapted to directly receive the subtracted output signals, said comparator being operatively associated with said first and second analog switches to cause either said first inputs or said second inputs to said first and second analog switches to be divided to produce said numerical value representative of the accurate angular position of said rotor, said comparator causing said second inputs to be divided when said subtracted output signals is a negative value.

42. The method for accurately determining the angular position of a rotor as defined by claim 41 wherein said output signal from said first sensor means is amplified by a gain of 10, said output signal from said second sensor means is amplified by a gain of 10, said added output signals are scaled by a factor of G1, and said subtracted output signals are scaled by a factor of −G2.

43. The method for accurately determining the angular position of a rotor as defined by claim 42 wherein said numerical value produced by dividing said added output signals by said subtracted output signals is multiplied by a reference voltage of 10 volts.

* * * * *